US007605938B2

United States Patent

(12) United States Patent
Ryu et al.
(10) Patent No.: US 7,605,938 B2
(45) Date of Patent: Oct. 20, 2009

(54) SYSTEM AND METHOD FOR PRINTING OUT IMAGE DATA AND TEXT DATA

(75) Inventors: Seok Ryu, Suwon-si (KR); Du-jl Kim, Suwon-si (KR); Kwang-chul Lee, Suwon-si (KR); Eun-hee Rhim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 834 days.

(21) Appl. No.: 11/172,882

(22) Filed: Jul. 5, 2005

(65) Prior Publication Data

US 2006/0028673 A1 Feb. 9, 2006

(30) Foreign Application Priority Data

Aug. 9, 2004 (KR) ...................... 10-2004-0062494

(51) Int. Cl.
*G06F 15/00* (2006.01)
*G06F 15/16* (2006.01)

(52) U.S. Cl. ...................................... 358/1.15; 709/203

(58) Field of Classification Search ................ 358/1.15, 358/1.16, 1.14, 1.18, 1.13; 709/203, 206, 709/245, 217, 224, 227, 228; 707/3, 10, 707/100, 104.1; 455/566; 719/318
See application file for complete search history.

(56) References Cited

U.S. PATENT DOCUMENTS

2005/0262049 A1* 11/2005 Somppi ......................... 707/3

FOREIGN PATENT DOCUMENTS

| | | | |
|---|---|---|---|
| JP | 2002-091726 | A | 3/2002 |
| JP | 2002-229752 | A | 8/2002 |
| JP | 2002-330394 | A | 11/2002 |
| JP | 2002-358173 | A | 12/2002 |
| JP | 2003-280874 | A | 10/2003 |
| JP | 2003-348410 | A | 12/2003 |
| JP | 2004-127132 | A | 4/2004 |
| KR | 2003-0013442 | A | 2/2003 |
| KR | 10-2004-0020933 | A | 3/2004 |
| WO | 02/03319 | A1 | 1/2002 |
| WO | 02/103967 | A2 | 12/2002 |

* cited by examiner

*Primary Examiner*—Saeid Ebrahimi Dehkordy
(74) *Attorney, Agent, or Firm*—Sughrue Mion, PLLC

(57) ABSTRACT

There are provided a system and a method for printing out image data and text data. The system for printing out image data and text data includes: a mobile device transmitting a document including link information on an image data file, file identification information for identifying the image data file, and text data, and then transmitting the image data file identified by the file identification information; and a printing-out device receiving the document, extracting the file identification information for identifying the image data file linked by the link information, receiving the image data file identified by the extracted file identification information, and printing out the received image data file and the text data.

22 Claims, 4 Drawing Sheets

Fig. 4

```
         Mime-Version: 1.0
         Content-Type: multipart/mixed; boundary="================_19050042==_"
A line:  --=============_19050042==_
         Content-Type: text/plain; charset="us-ascii"
         <?xml version="1.0" encoding="UTF-8"?>
         <! DOCTYPE html PUBLIC "-// PWG//DTD XHTML-Print 1.0// EN"
               "http://www.pwg.org/xhtml-print/xhtml-print10.dtd">
         <html xmlns="http://www.w3.org/1999/xhtml">
         <head>
         <link rel="stylesheet" href="./css/ucase-mime.css" />
         <style>
           .smaller {font-size: 6pt; } div {font-size: 10pt; text-align: center; }
         </ style>
         </ head>
         <body>
           <div class="overallMIPC">
B line:      <div class="test_style"> <center> Welcome to MIPC's Use Case #1 World <br />
                  </ center> </ div> <br />
             <div class = " sNatural">
C line:           <div class= "Imageleft"> <img align=right src="images/ruiri.jpg" class= "imageleft"/>
             </ div>
           </ div>
         </ body>
         </html>
D line:  --=============_19050042==_
         Content-Type: text/plain; name=mipc.xml charset="us-ascii"
         <?xml version="1.0" encoding="UTF-8"?>
         <PrintFile xmlns="http://www.mipc.org/Prinflie/">
         <Style filename= "./css/ucase-mime.css">
E line:  <imagename>./images/ruiri.jpg</imagename>
F line:     <user_define>00000006</user_define> <!-image file ID->
```

SYSTEM AND METHOD FOR PRINTING OUT IMAGE DATA AND TEXT DATA

CROSS-REFERENCE TO RELATED APPLICATION

This application claims priority from Korean Patent Application No. 10-2004-0062494 filed on Aug. 9, 2004 in the Korean Intellectual Property Office, the disclosure of which is incorporated herein by reference in its entirety.

BACKGROUND OF THE INVENTION

1. Field of the Invention

The present invention relates to printing out image data and text data, and more particularly to a system and a method for printing out image data and text data by connecting a mobile device, which can capture an image and show the captured image, to a printing-out device such as a printer.

2. Description of the Related Art

Recently, thanks to the development of communication technologies, mobile devices having a variety of functions have come onto the market, and a representative example thereof includes a mobile device having an image capture function.

Such a mobile device provides a function of transmitting a captured image to a printing-out device such as a printer through a variety of transmission media so as to print out the captured image. At this time, the mobile device and the printing-out device can communicate with each other by using a protocol promised therebetween.

FIG. 1 is a flowchart exemplifying a conventional procedure of printing out image data. In the figure, a mobile phone 110 and a printer 120 are exemplified as the mobile device and the printing-out device, respectively, for the purpose of simplification of explanation.

First, when a user connects the mobile phone 110 to the printer 120 by using a transmission medium such as a USB cable, a printer identification step is carried out between the mobile phone 110 and the printer 120 (S130). Since various devices can be connected to the mobile phone 110, the printer identification step of allowing the mobile phone 110 to identify the connected printer 120 should be performed.

When the connected printer 120 is identified, a step of allowing the mobile phone 110 to extract printer information is performed (S140). At this time, the printer information can include a printer maker, a serial number specific to the printer, etc.

After the mobile phone 110 checks the printer information, a step of selecting printing-out services to be provided from the printer 120 is performed (S150). At this time, the printing-out services to be selected can include formats of image data, color formats such as a full color format or a black and white format, maximum data sizes of printable image data, etc. When the mobile phone 110 selects the printing-out services, a printing-out job is performed (S160). For example, when the printer 120 requests the mobile phone 110 for information on the image data file to be printed out, the mobile phone 110 transmits information such as file name, file size, file format, etc. to the printer 120. Thereafter, the printer 120 requests the relevant image data file, and the mobile phone 110 transmits the requested image data file. As a result, the image data desired by the user is printed out. At this time, when the printing-out job is performed normally, a message indicating that the printing-out job is completed normally, such as "Job End", can be displayed in the display screen of the mobile phone 110. On the other hand, when the printing-out job is not performed normally, relevant error messages can be displayed.

In the past, there was provided such a technique of connecting the mobile device such as the mobile phone 110 and the printing-out device such as the printer 120 directly to each other, thereby printing out the image data. However, a technique of simultaneously printing out text data and image data has not been provided. For example, when a user conventionally takes a photograph of a person by using a mobile phone fitted with a camera, it is not possible to allow the user to input the name of the photographed person directly to the taken photograph and to simultaneously print out the input text data and the taken image data.

Therefore, when it is considered that needs of users can be more diversified, methods of printing out image data along with text data input by a user or previously stored text data are required.

SUMMARY OF THE INVENTION

The present invention is contrived to address the above-mentioned problems. An object of the present invention is to print out image data and text data with a printing-out device, which is desired by a user using a mobile phone.

Another object of the present invention is to transmit and receive a document between a mobile device and a printing-out device when printing out image data and text data, the document being prepared in accordance with a multipurpose internet mail extension (MIME) standard.

Another object of the present invention is to provide a method in which information of the document for printing out the image data and the text data is described in a mark-up language.

Objects of the present invention are not limited to the above-mentioned objects, and other objects of the present invention not described above can be apparently understood by those skilled in the art with reference to the following description.

In order to accomplish the above-mentioned objects, according to an aspect of the present invention, there is provided a system for printing out image data and text data, the system comprising: a mobile device transmitting a document including link information on an image data file, file identification information for identifying the image data file, and text data, and then transmitting the image data file identified by the file identification information; and a printing-out device receiving the document, extracting the file identification information for identifying the image data file linked by the link information, receiving the image data file identified by the extracted file identification information, and printing out the received image data file and the text data.

According to another aspect of the present invention, there is provided a mobile device for outputting image data and text data, the mobile device comprising: a storage module storing an image data file or text data; a user interface module allowing a user to specify an image data file and text data to be output to a printing-out device; a control module generating a document including link information indicating a position where the specified image data file is stored in the storage module, file identification information for identifying the specified image data file, and the text data, and extracting from the storage module the image data file identified by the file identification information requested by the printing-out device; and an external-device interface module receiving the document from the control module, transmitting the received document to the printing-out device, receiving the extracted image data file from the control module, and transmitting the received image data file to the printing-out device.

According to another aspect of the present invention, there is provided a method of printing out image data and text data, the method comprising the steps of: (a) allowing a mobile device to transmit to a printing-out device a document including link information on an image data file, file identification information identifying the image data file, and text data; (b) allowing the printing-out device to receive the document and to extract the link information from the received document; (c) allowing the printing-out device to acquire file identification information identifying the image data file linked by the extracted link information and to transmit the acquired file identification information; (d) allowing the mobile device to transmit to the printing-out device the image data file corresponding to the received file identification information; and (e) allowing the printing-out device to print out the text data and the image data file.

Other details according to other aspects of the present invention are included in the following detailed description and the drawings.

BRIEF DESCRIPTION OF THE DRAWINGS

The above and other features and advantages of the present invention will become more apparent by describing in detail exemplary embodiments thereof with reference to the attached drawings in which:

FIG. 4 is a diagram exemplifying a code recorded in a MIME-based file prepared according to an embodiment of the present invention.

DETAILED DESCRIPTION OF THE EMBODIMENTS

Various features and advantages of the present invention, and methods for facilitating them will be apparent to those skilled in the art by describing embodiments in detail with reference to the attached drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. Thus, it is intended that the present invention cover the modifications and variations of this invention without departing from the scope of the appended claims and their equivalents.

The present invention is described hereinafter with reference to flowchart illustrations of user interfaces, methods, and computer program products according to embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order shown. For example, two blocks shown in succession may in fact be executed substantially concurrently or the blocks may sometimes be executed in the reverse order, depending upon the functionality involved.

Figure 2:
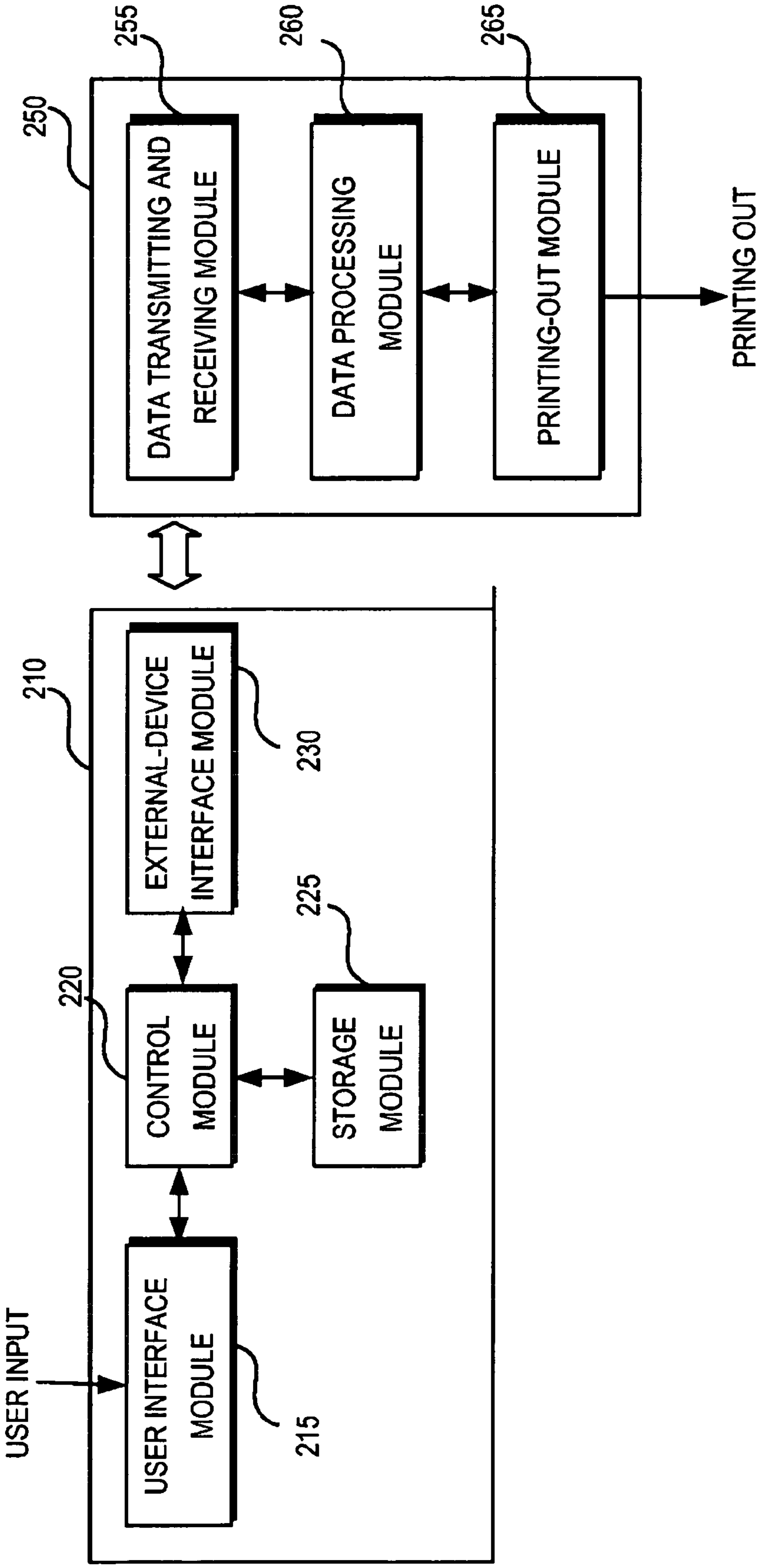
FIG. 2 is a block diagram illustrating a system for printing out image data and text data according to an embodiment of the present invention.

FIG. 2 is a block diagram illustrating a system for printing out image data and text data according to an embodiment of the present invention. The system comprises a mobile device 210 which performs a photographing function like a camera and transmits the photographed image to an external device via an interface capable of communicating with the external device, and a printing-out device 250 which receives image data or text data from the mobile device 210 and outputs the received data. At this time, the mobile device 210 and the printing-out device 250 can be connected to each other through a wired transmission medium such as a USB cable or a wireless transmission medium using radio signals.

The mobile device 210 comprises a user interface module 215, a control module 220, an external-device interface module 230, and a storage module 225.

The user interface module 215 receives text data from a user or provides text data previously stored in the storage module 225 to the user. The user interface module 215 serves to display image data files of various formats in a display screen. The user interface module 215 also receives instructions indicating the output of text data or image data from the user.

The storage module 225 stores text data or image data.

The external-device interface module 230 is a module connected to a wired or wireless transmission medium, and transmits data to and receives data from an external device such as the printing-out device 250 through the transmission medium.

The control module 220 extracts text or image data from the storage module 225 and sends the extracted text or image data to the user interface module 215, or sends the text or image data to the external-device interface module 230 in accordance with the user's instruction, thereby making the printing-out device 250 print out the text or image data. The control module 220 generates a document for printing out the text or image data to be transmitted to the printing-out device 250 and controls the communication with the printing-out device 250.

The printing-out device 250 comprises a data transmitting and receiving module 255, a data processing module 260, and a printing-out module 265.

The data transmitting and receiving module 255 transmits data to and receives data from the mobile device 210 through the transmission medium.

The data processing module 260 analyzes the document received from the mobile device 210, and performs a preliminary operation for printing out the text or image data.

The printing-out module 265 receives the text data or the image data to be output from the data processing module 265 and serves to print out the text data or the image data on a printing sheet.

The term 'module', as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Figure 3:
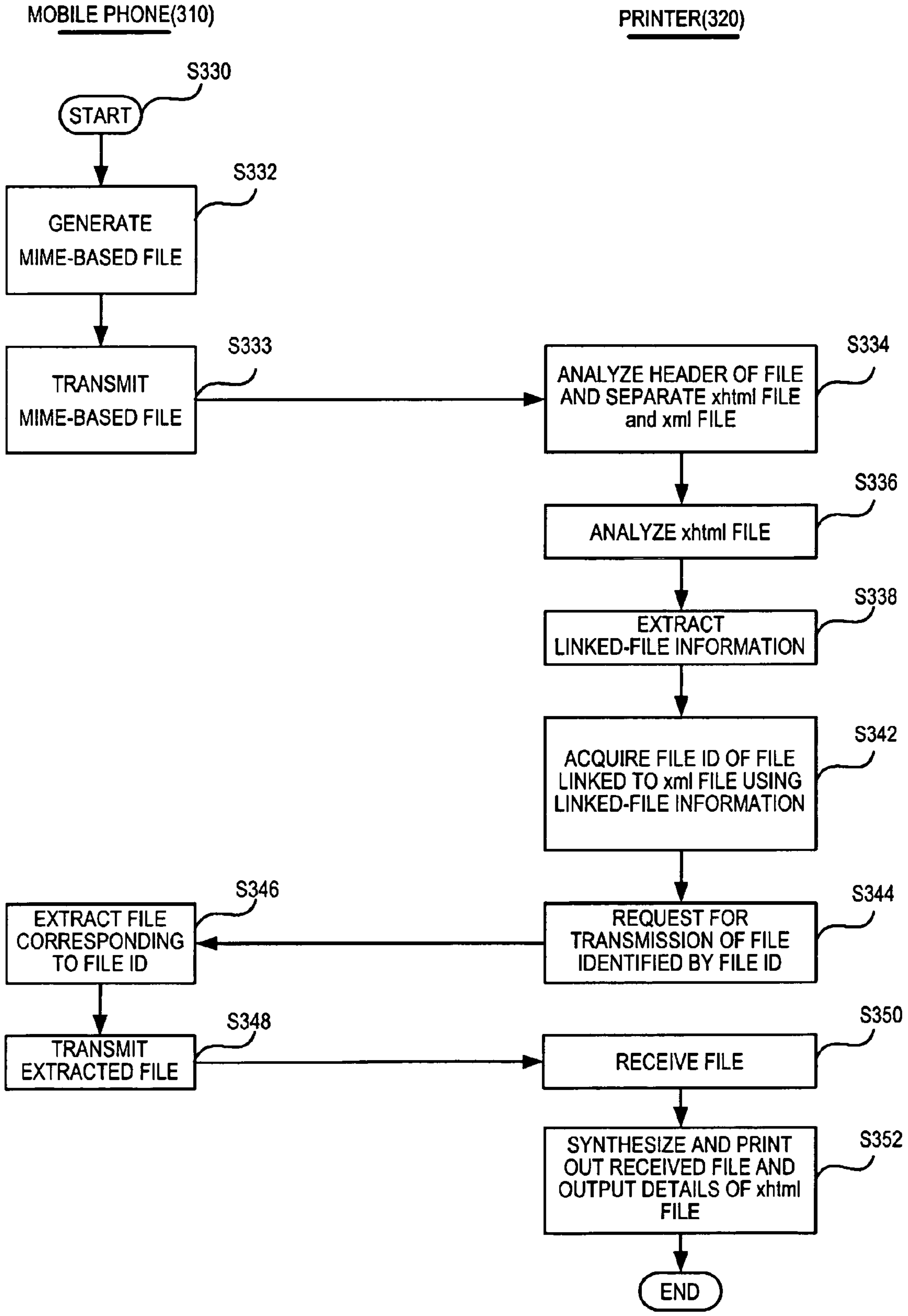
FIG. 3 is a flowchart illustrating a procedure of printing out image data and text data according to an embodiment of the present invention.

Now, operations of the modules will be more specifically described with reference to the flowchart shown in FIG. 3. Here, in FIG. 3, a mobile phone 310 and a printer 320 are exemplified as the mobile device 210 and the printing-out device 250, for the purpose of facilitating the description of the present invention.

Figure 1:
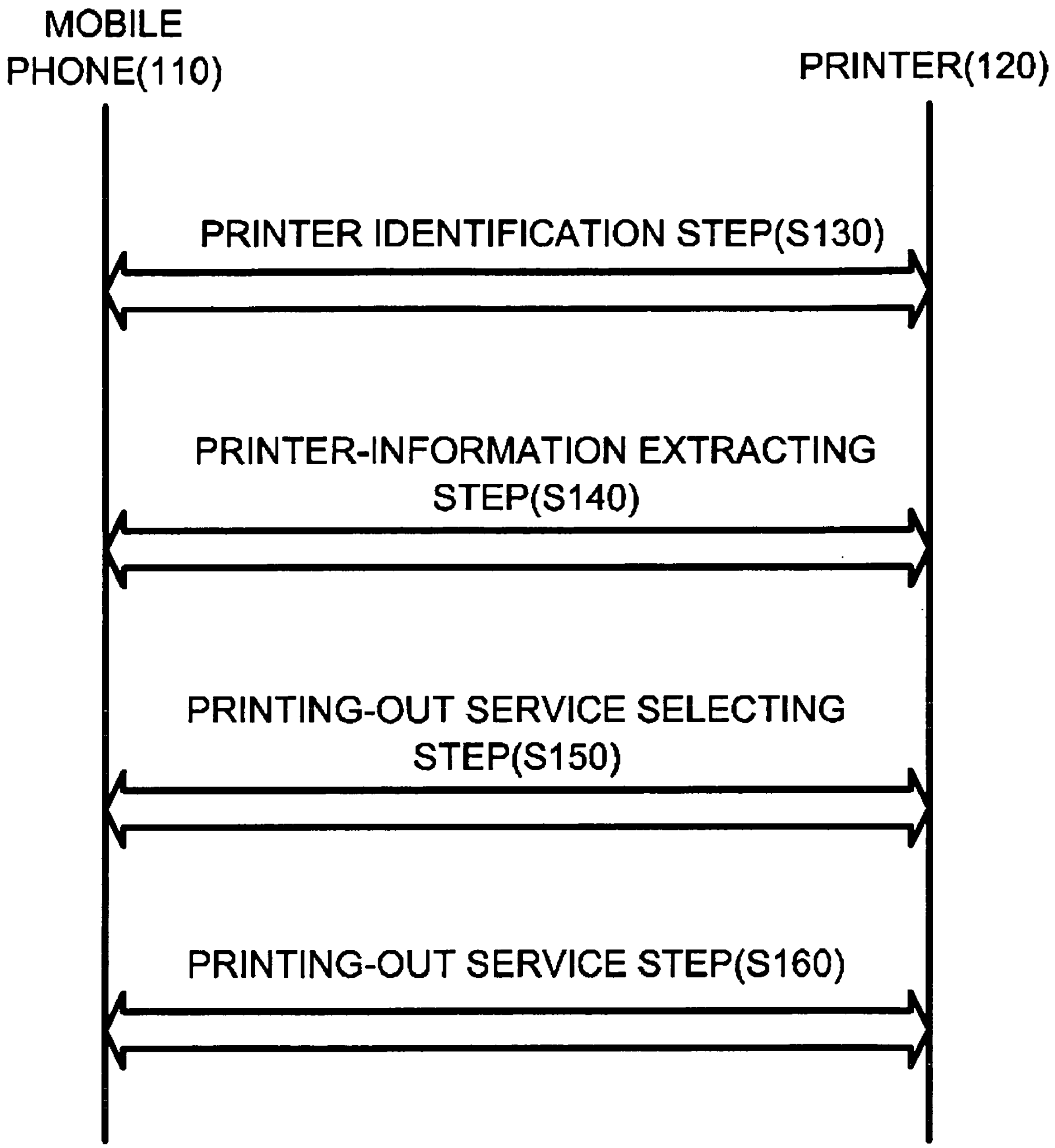
FIG. 1 is a flowchart exemplifying a conventional procedure of printing out image data.

On the other hand, the present invention relates to improvement of the printing-out service step (S160) of the conventional method shown in FIG. 1. Accordingly, the printer identification step (S130), the step of extracting the printer information (S140), and the step of selecting the printing-out services (S150) may be performed, or steps similar thereto may be performed, before performing the substantial printing-out service.

First, a user specifies text data and image data to be printed out by using the user interface module 215 and gives a printing-out instruction (S330).

At this time, an image data file previously stored in the storage module 225 may be selected as the image data, or an image data file taken by the user just before may be selected as the image data. The text data may be input directly by the user, or may be selected from text data stored previously in the storage module 225. Therefore, the mobile phone 310 includes menus and functional buttons for specifying text data and image data. When a user specifies text data and image data to be printed out and gives a printing-out instruction, the user interface module 215 receives and sends information on the specified text data and image data and the printing-out instruction to the control module 220. The control module 220 generates a document to be transmitted to the printer 320 (S332). At this time, it is preferable, but not necessary, that the document is prepared in accordance with multipurpose internet mail extension (MIME) standard. A code recorded in an MIME-based file prepared according to an embodiment of the present invention is exemplified in FIG. 4.

The MIME-based file according to the embodiment of the present invention includes an MIME-header area positioned above Line A, a first information area described in XHTML (eXtensible Hyper Text Markup language) and positioned between Line A and Line D, and a second information area described in XML (eXtensible Markup Language) and positioned below Line D.

The first information area includes text data to be printed out and link information indicating a position where the image data to be printed out are stored in the storage module 225 of the mobile phone 310. In FIG. 4, the text data to be printed out are described in Line B and the link information is described in Line C.

The second information area includes identification information identifying the image data file linked by the link information. In FIG. 4, the identification information is described in Line E and Line F.

When the MIME-based file having the above-mentioned structure is generated by the control module 220, the control module transmits the generated file to the printer 320 through the external-device interface module 230 (S333).

The data transmitting and receiving module 255 of the printer 320 receives the generated file from the external-device interface module 230 and sends the received file to the data processing module 260.

The data processing module 260 analyzes the MIME-header and the headers of the first information area and the second information area in the received file, and separates the xhtml file corresponding to the first information area and the xml file corresponding to the second information area from each other (S334).

Then, the data processing module 260 analyzes the xhtml file, extracts the text data to be printed out (S336), and extracts the link information of the image data file to be printed out (S338).

The data processing module 260 analyzes the xml file corresponding to the second information area after analyzing the xhtml file. At this time, the data processing module 260 acquires the file identification information identifying the linked file by using the link information extracted from the xhtml file (S342).

The data processing module 260 transmits the acquired file identification information to the external-device interface module 230 of the mobile phone 310 through the data transmitting and receiving module 255 so as to obtain the image data file to be printed out (S344).

The external-device interface module 230 sends the received file identification information to the control module 220. The control module 220 extracts the image data file corresponding to the file identification information from the storage module 225 (S346). The extracted image data file is transmitted to the data processing module 260 through the external-device interface module 230 and the data transmitting and receiving module 255 of the printer 320 (S348 and S350).

The data processing module 260 synthesizes the received image data file and the text data extracted in step S336, and prints out the synthesized image through the printing-out module 265 (S352).

According to the embodiments of the present invention described above, a user can print out text data as well as image data by connecting a mobile device directly to a printing-out device such as a printer.

While the present invention has been particularly shown and described with reference to exemplary embodiments thereof, it will be understood by those skilled in the art that various changes in form and details may be made therein without departing from the spirit and scope of the present invention. The exemplary embodiments should be considered in a descriptive sense only and not for purposes of limitation. Therefore, the scope of the present invention is defined not by the detailed description of the present invention but by the appended claims, and all differences within the scope will be construed as being included in the present invention.

What is claimed is:

1. A method of printing data, the method comprising:

generating a first mark-up document that describes a file to be printed, the first mark-up document comprising text data and link data that indicates a location at which the file is stored in a storage unit;

generating a second mark-up document that describes the file, the second mark-up document comprising identification information that identifies the file at the location indicated by the link data; generating a document to be transmitted to a printing device using the first mark-up document and the second mark-up document; transmitting the generated document to the printing device; analyzing the document at the printing device to obtain the link data and the identification information;

transmitting a request for the file based on the extracted link data and identification information;

extracting the file from the storage unit in response to the request for the file based on the extracted link data and identification information;

receiving the file in response to the request for the file at the printing device; and outputting the file at the printing device.

2. The method according to claim 1, wherein the document to be transmitted to the printing device is prepared in accordance with a Multipurpose Internet Mail Extension (MIME) standard.

3. The method according to claim 1, wherein the file to be printed is at least one of a data file and a text data file.

4. The method according to claim 1, wherein the first mark-up document is an extensible Hyper Text Markup Language (XHTML) document.

5. The method according to claim 1, wherein the second mark-up document is an extensible Markup Language (XML) document.

6. The method according to claim 1, wherein the outputting comprises simultaneously outputting the file and the text data at the printing device.

7. The method according to claim 1, wherein the document to be transmitted to the printing device comprises the text data, the link data, and the identification information.

8. A method of printing data, the method comprising:

receiving a printing information document comprising:

a first mark-up document that describes a file to be printed, the first mark-up document comprising text data and link data that indicates a location at which the file is stored in a storage unit; and a second mark-up document that describes the file, the second mark-up document comprising identification information that identifies the file at the location indicated by the link data;

extracting the link data and the identification information from the printing information document;

transmitting a request for the file to be printed based on the extracted link data and identification information;

receiving the file to be printed from the storage unit in response to the request for the file based on the extracted link data and the extracted identification information;

receiving the file in response to the request for the file at the printing device; and printing the file at the printing device.

9. The method according to claim 8, wherein the printing information document is prepared in accordance with a Multipurpose Internet Mail Extension (MIME) standard.

10. The method according to claim 8, wherein the file to be printed is at least one of a data file and a text data file.

11. The method according to claim 8, wherein the first mark-up document is an extensible Hyper Text Markup Language (XHTML) document.

12. The method according to claim 8, wherein the second mark-up document is an extensible Markup Language (XML) document.

13. A device for printing data, the device comprising:

a storage module that stores a file to be printed;

a control module that generates a first mark-up document that describes the stored file, the first mark-up document comprising text data and link data that indicates a location at which the file is stored in a storage unit, and a second mark-up document that describes the file, the second mark-up document comprising identification information that identifies the file at the location indicated by the link data, and that generates a document to be transmitted to a printing device using the first mark-up document and the second mark-up document; and an external-device interface module that transmits the generated document to the printing device, wherein the printing device analyzes the document to obtain the link data and the identification information, transmits a request for the file to the device for printing data based on the extracted link data and identification information, receives the file from the device for printing data that is extracted from the storage module based on the extracted link data and identification information, and outputs the file.

14. The device according to claim 13, wherein the document to be transmitted to the printing device is prepared in accordance with a Multipurpose Internet Mail Extension (MIME) standard.

15. The device according to claim 13, wherein the file to be printed is at least one of a data file and a text data file.

16. The device according to claim 13, wherein the first mark-up document is an extensible Hyper Text Markup Language (XHTML) document.

17. The device according to claim 13, wherein the second mark-up document is an eXtensible Markup Language (XML) document.

18. A device for printing data, the device comprising:

a data transmitting and receiving module that receives a printing information document comprising a first markup document that describes a file to be printed, the first mark-up document comprising text data and link data that indicates a location at which the file is stored in a storage unit, and a second markup document that describes the file, the second mark-up document comprising identification information that identifies the file at the location indicated by the link data;

a data processing module that extracts the link data and the identification information from the printing information document, wherein the data transmitting and receiving module transmits a request for the file to be printed based on the extracted link data and the extracted identification information and receives the file to be printed based on the extracted link data and the extracted identification information; and an outputting module that prints the received file based on the extracted link data and the extracted identification information.

19. The device according to claim 18, wherein the printing information document is prepared in accordance with a Multipurpose Internet Mail Extension (MIME) standard.

20. The device according to claim 18, wherein the file to be printed is at least one of a data file and a text data file.

21. The device according to claim 18, wherein the first mark-up document is an extensible Hyper Text Markup Language (XHTML) document.

22. The device according to claim 18, wherein the second mark-up document is an eXtensible Markup Language (XML) document.

* * * * *

UNITED STATES PATENT AND TRADEMARK OFFICE

CERTIFICATE OF CORRECTION

PATENT NO. : 7,605,938 B2
APPLICATION NO. : 11/172882
DATED : October 20, 2009
INVENTOR(S) : Ryu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1141 days.

Signed and Sealed this

Fifth Day of October, 2010

David J. Kappos
*Director of the United States Patent and Trademark Office*